UNITED STATES PATENT OFFICE.

PAUL G. L. G. DESIGNOLLE, OF PARIS, FRANCE.

IMPROVEMENT IN ARTIFICIAL ANIMAL-BLACK.

Specification forming part of Letters Patent No. 197,831, dated December 4, 1877; application filed October 11, 1877.

*To all whom it may concern:*

Be it known that I, PAUL G. L. G. DESIGNOLLE, of Paris, France, have invented certain new and useful Improvements in the Production of Artificial Animal-Black, of which the following is a full, clear, and exact description:

The characteristic feature of the product the manufacture of which is the subject-matter of this invention is its absolute identity with the black which proceeds from the burning or calcining of bones. This identity is not only one of chemical composition and physical properties, but extends to the immediate principles the transformation of which creates what is well known as "bone-black." Both the mineral and organic substances the mixture of which constitutes the prime matter of my absorbent and decolorizing coal are perfectly analogous in every particular with those which compose animal-black.

Inasmuch as the physical and chemical properties, as well as the elementary composition and the intensity of the decoloring power of the various blacks, vary with the nature of the substances which engender the same, I deem it of the utmost importance to produce a black which, in respect to the organic portion thereof, is identical with that derived from the bones; and I have accomplished this by the substitution for the osseine of a substance which is of animal origin, and which is also isomeric with it—that is to say, a substance which, like osseine, when subjected to the action of boiling water will be dissolved and transformed into gelatine, it being well known that osseine produces by boiling its own weight of gelatine, and therefore the two substances, although essentially different in their properties, are identical according to chemical analysis, and therefore the one substance is a mere molecular transformation of the other with which it is isomeric. This fact is of prime importance in view of the artificial composition of animal-black, and it allows of a certain latitude in the substitution for the osseine considered as the source of the carbon of any substance which is identical with it in regard to the principle of composition, as before stated—that is to say, a gelatine or a gelatinous or any other substance capable of being transformed into gelatine under the action of various agencies.

Now, it is well known that certain animal tissues, and particularly the dermic and epidermic tissues, have the property of being dissolved or transformed into gelatine by boiling water. This property is found to exist in all tanned skins and all kinds of leathers when previously treated or modified by my process.

The principle upon which my invention is based is, that all kinds of leather may be rendered isomeric with osseine, and thus replace that substance as a source of animal-black.

I have employed with equal success all kinds of green skins or leather and clippings and wastes of tanned leathers, such as are found in tanneries and elsewhere.

As to the mineral portion of the bones, only two appear to have any importance as affecting the absorbent properties of blacks, and those are the phosphates of lime and magnesia, having three equivalents of base for one of acid.

Investigations which I instituted on this subject have led to the following results: First, when phosphate of magnesia is heated under pressure with lime-water a phenomenon of substitution takes place to form a tricalcic phosphate, while insoluble magnesia is set free. This phenomenon explains the superiority of newly-made black over revivified black so far as its absorbent property is concerned. Second, under the influence of heat and pressure the insoluble bibasic phosphate of lime fixes an equivalent of lime in order to become tribasic phosphate. There is therefore no comparison to be established between the bibasic phosphate, which absorbs more than twenty per cent. of its weight of lime, and the tribasic phosphate, whose action is probably merely mechanical. Third, that the basic phosphate of magnesia fixes free ammonia and the volatile ammoniacal salts, such as the carbonate and sulphydrate of ammonia.

These facts have led to the following conclusions: First, by substituting in the bone-black, made in accordance with my invention, the bicalcic for tricalcic phosphate, the capacity for absorbing the free lime is greatly increased. Second, it is advisable to increase the proportion of the phosphate of magnesia in order to augment the absorbent property of the black for the salts of lime and the volatile ammoniacal salts.

The manufacture of artificial bone-black according to my invention is based upon the foregoing facts and conclusions.

The manufacture comprises, first, the preparation of the skins or leathers destined to replace the osseine and to furnish the carbon; second, the mixture of organic and mineral substances and the composition of the artificial bone-black; third, the calcining process.

First. The remnants, clippings, or wastes of skins, hides, or newly-tanned leathers, after being properly assorted and separated from all foreign matters, are placed in a closed vessel, into which steam may be admitted at a pressure of six atmospheres. A small quantity of water is added, in which from one to five per cent. (in weight of the material to be treated) of caustic soda has been previously dissolved, the proportion of soda varying with the nature of the leather. Steam is then admitted. At first there is a heavy condensation, which increases the proportion of the liquid in the vessel; but shortly afterward, the equilibrium of temperature between the steam and the matter to be treated being established, no further condensation takes place. After a lapse of time of from one to two hours, according to the consistency or body of the leather, and according to the tanning having been carried on more or less completely, the matter which has been converted into the form of semi-liquid magma is then subjected to the action of a centrifugal machine, which separates from it the liquid charged with tannate of soda, mixed with a small portion of gelatine. The product remaining in the basket constitutes a real glue, which is susceptible of giving a large quantity of gelatine by being boiled in water. To free the substance from any foreign matter that might be admixed, it should be forced through a close or fine sieve, or through wire-cloth, by means of a hydraulic press.

Second. The magma or modified or transformed leather, having been thus prepared, is mixed with the phosphate of lime and magnesia in the following manner and proportions: A given quantity of magma or wet leather being taken, it is dried at 110°, and by the loss of weight the quantity of vaporized water is determined. Now, it being known that perfectly dry bones deprived of grease contain about thirty-three per cent. of organic matter, a quantity of magma is taken, such that when deprived of its water at 110° it will weigh about thirty-three kilograms. Into this is incorporated fifty kilograms of bibasic phosphate of lime and seventeen kilograms of phosphate of magnesia, both being perfectly dry. The mixture is effected by suitable machinery. After a short time of mixing a solid mass will be obtained, in which the mineral substances are as intimately as possible mixed with the organic substances. This mass is then subjected to powerful pressure by means of a hydraulic press, care being taken to separate the different layers of the product by means of absorbent cloths or felts.

If the mass is allowed to gradually attain its maximum of compression, extremely hard cakes will be obtained, the texture of which will have the appearance of bone. These cakes, when removed from the presses, are then thoroughly dried in suitable ovens at 110°, or thereabout. They are perfectly dry when they cease to lose any weight during the drying process, and nothing remains but to calcine them.

Third. The calcining or charring of the substance needs but passing mention. It is executed by the methods and by the means of furnaces generally in use for bone-burning. It is, however, important that the heat in the furnace should be regulated. The heat should be applied gradually, commencing with a low temperature; otherwise the cakes will break and crumble.

By proceeding as above an artificial bone-black will be obtained, which is in every particular like the natural bone-black, which can be revivified or reclaimed as the latter. After the charring or burning or calcining the mass may be broken into pieces and granulated, the same as is done with natural bone-black.

In order to avoid confusion I have given but a single formula for the composition; but I would observe that it may be varied without materially changing the result, and without departure from my invention. On the contrary, what renders my invention of particular value is that it affords facility of changing the elementary composition of bone-black, according to the uses it is intended to be put to. For instance, in the treatment of saccharine juices the action of bone-black is multiple. It acts as a decoloring agent—as an absorbent of free lime, of salts of lime, and of certain ammoniacal salts—from which it results that there is advantage in modifying the composition of the black according to the nature of the saccharine juices to be treated.

In the refining of sugar, the principal object is to decolorize the raw sugar, which contains but a small quantity of calcareous salts, and for such purpose the bone-black ought to be essentially a decolorizing agent, and therefore rich in carbon; and this is obtained by increasing in the mixture the relative proportion of organic matter and decreasing that of the phosphate. If, on the other hand, the saccharine juices are to be defecated and contain considerable quantities of free lime or calcareous salts, then the relative proportion of carbon should be diminished, whereas that of the phosphate increased. The composition could, and may, therefore, be varied according to the employment or uses of the black. The use of the artificial black as prepared by me is not confined to the treatment of saccharine juices. I have used it for the clarification, filtration, and purification of water for drinking purposes, and also of such as have been derived from sewers, factories, and other sources, and thereby rendered infectious. As to the latter, I deem the application of my artificial black of the utmost importance in view of public health and utilization of the human excrements for manuring purposes. To this end the black should be composed of animal-charcoal, hereinbefore described, and neutral phosphate of magnesia.

Infectious water can be clarified and disinfected by simple filtration through such black, which at the same time fixes the volatile ammoniacal salts, which are held in solution—that is to say, the fertilizing elements, which are so useful in agriculture. After having thus been filtered the waters may be allowed to run into the sewer or river without any inconvenience.

The black itself, after filtration through it of those infectious waters, constitutes a perfect manure, extremely rich in ammoniacal niter and phosphoric acid and magnesia.

For convenience' sake I have prepared my artificial bone-black in various shapes by molding the same. I have used it molded in the shape of cylindrical vessels, so that the liquid may filter through the mass upon all sides.

Having thus described my said invention, and the manner in which the same is or may be carried into effect, what I claim, and desire to secure by Letters Patent, is—

1. In the manufacture of artificial bone-black, the process, herein described, of supplying a carbon-producing ingredient by subjecting leather clippings or other analogous substance to the action of caustic soda solution under heat and pressure.

2. The process of manufacturing artificial bone-black, consisting of mixing a gelatine magma with bibasic phosphate of lime and neutral phosphate of magnesia, and calcining the mass until charring is completed, as and for the purposes herein described.

3. An artificial bone-black in which the proportions of the phosphates are varied according to the purposes for which the black is to be used, all substantially as herein described and set forth.

DESIGNOLLE.

Witnesses:
  DUMAS,
  A. STROTT.